United States Patent [19]

Lloyd

[11] Patent Number: 5,048,579
[45] Date of Patent: Sep. 17, 1991

[54] TREE STUMP CUTTER

[76] Inventor: Johnny D. Lloyd, 16 Boaker Road, Bisley Heights, Pietermaritzburg, Natal Province, South Africa

[21] Appl. No.: 547,951

[22] Filed: Jul. 2, 1990

Related U.S. Application Data

[63] Continuation-in-part of Ser. No. 427,825, Oct. 26, 1989.

[30] Foreign Application Priority Data

Oct. 23, 1988 [ZA] South Africa ..................... 88/8120
Apr. 5, 1990 [ZA] South Africa ..................... 90/2657

[51] Int. Cl.$^5$ ............................................ A01G 23/06
[52] U.S. Cl. ..................... 144/2 N; 37/2 R; 56/255; 56/DIG. 12; 144/34 R
[58] Field of Search .............. 83/495, 928; 37/2 R; 30/379.5; 56/DIG. 2, 255, 256, 13.5, 13.6; 144/2 N, 3 D, 34 R, 34 E

[56] References Cited

U.S. PATENT DOCUMENTS

| | | | |
|---|---|---|---|
| 4,445,557 | 5/1984 | Peters, III | 37/2 R |
| 4,592,398 | 6/1986 | Golob et al. | 144/34 R |
| 4,697,625 | 10/1987 | Bolton | 144/2 N |

Primary Examiner—W. Donald Bray
Attorney, Agent, or Firm—Greenlee & Associates

[57] ABSTRACT

A tree stump cutter than enables the removal of tree stumps, after felling of trees, to at least below ground level, includes at least one pair of circular cutting blades rotatably mounted on a support frame. The frame can be coupled to a tractor in a configuration in which the blades, driven by hydraulic motors, can cut off tree stumps below ground level by being displaced across the tree stumps by the tractor. The blades are rotatable about parallel axes and the blades of at least one pair are spaced apart by approximately the sum of their radii, thus permitting rotation in substantially the same plane.

22 Claims, 5 Drawing Sheets

TREE STUMP CUTTER

This application claims priority from South Africa Pat. Application Ser. No. 90/2657, filed Apr. 5, 1990, and from U.S. Pat. Application Ser. No. 07/427,825, filed Oct. 26, 1989, now abandoned, which claims priority from South Africa Pat. Application No. 88/8120, filed Oct. 28, 1988.

FIELD OF THE INVENTION

This invention relates to a tree stump cutter.

BACKGROUND OF THE INVENTION

After tree felling, when only tree stumps remain, it is necessary to remove the stumps, at least to below ground level, so that the ground can be ploughed and treated in order to enable planting of new trees. The removal of tree stumps has proved to be a difficult and time consuming operation and it is accordingly an object of this invention to provide an improved apparatus for removing tree stumps.

SUMMARY OF THE INVENTION

According to the invention there is provided a tree stump cutter comprising:

(a) a support frame having a central longitudinal axis along which said stump cutter can be moved;

(b) a first pair of circular cutting blades, each of said blades having an axis of rotation and a radius and lying in a plane, each of said blades being rotatably mounted on said support frame in a configuration in which said blades lie in substantially the same plane, said blades being rotatable about parallel axes that are separated by a distance approximately equal to the sum of the radii of said blades, so that said blades rotate without interference with one another;

(c) a drive means for rotating said blades; and (d) a coupling means for coupling said support frame to said displacement means, said coupling means being positioned and shaped such that said blades are held in a configuration so that when said stump cutter is moved and said blades are rotated, a tree stump can be cut-off by said blades beneath ground level when the stump passes between the axes of rotation of said blades.

Said displacement means may be a tractor, a three-point coupling of said tractor being coupled to the support frame of said tree stump cutter by the coupling means. The tree stump cutter further may include depth control means which permits control over the depth beneath ground level at which said blades will cut-off a tree stump.

The axes of rotation of said blades may be disposed on opposite sides of the central longitudinal axis of said support frame. Particularly, the axes of rotation of the blades may intersect a line perpendicular to the said line of displacement of said stump cutter.

Furthermore, the plane defined by said blades may be inclined with respect to the general ground level beneath which tree stumps must be cut during use of said stump cutter, the angle of inclination being such that said blades will tend to penetrate the ground further during displacement of said stump cutter. Typically, the said angle of inclination is approximately five degrees with respect to the general ground level.

The drive means for rotating said cutting blades may include at least one hydraulic motor mounted on said support frame. Preferably, a hydraulic motor is provided for rotating each cutting blade, the hydraulic motor being driven by a hydraulic power supply of said displacement means for moving said stump cutter.

Still further, the drive means may be adapted to rotate said blades in opposite directions, the direction of rotation of said blades being such that during moving of said stump cutter while cutting through a stump, the rotation of said blades will tend to centre said stump between said blades.

The tree stump cutter of the invention further may include:

(a) a second pair of circular cutting blades, each of said blades having an axis of rotation and a radius and lying in a plane, said second pair of circular cutting blades being rotatably mounted on said support frame in a location operatively forwardly of said first pair of cutting blades with respect to the line of displacement along which said displacement means can move said stump cutter, said blades of said second pair of blades being mounted on said support frame in a configuration in which said blades lie in substantially the same plane as said first pair of blades, said blades being rotatable about parallel axes that are separated by a distance larger than the sum of the radii of said blades; and (b) drive means for rotating said second pair of cutting blades, said coupling means, with said support frame coupled to said displacement means, holding said two pairs of cutting blades in a configuration so that when said stump cutter is moved and said blades are rotated, a tree stump cutter can be partially cut through by said second pair of blades beneath ground level when the stump passes between the axes of rotation of said second pair of blades and is finally cut-off by said first pair of blades when the stump passes between the axes of rotation of said first pair of blades.

For this embodiment of the invention, which includes a second pair of cutting blades, the general configuration of the tree stump cutter may be similar to that of the tree stump cutter having only a single pair of cutting blades, the axes of rotation of the blades of said first and second pairs of blades respectively, intersecting parallel lines perpendicular to said line of displacement of said stump cutter. The blades of said first and second pairs of blades also may be similarly inclined.

Still further, the drive means for both said first pair of cutting blades and said second pair of cutting blades may include at least one hydraulic motor mounted on said support frame, a preferred embodiment of the invention providing for one hydraulic motor for rotating one cutting blade of each pair of cutting blades. Also, the blades of each pair of cutting blades may be rotated in opposite directions so that a tree stump, during cutting, will tend to centre itself between the blades of the respective pairs of blades.

BRIEF DESCRIPTION OF THE FIGURES

The invention is now described, by way of examples, with reference to the accompanying diagrammatic drawings, in which.

DETAILED DESCRIPTION OF THE INVENTION

Figure 1:
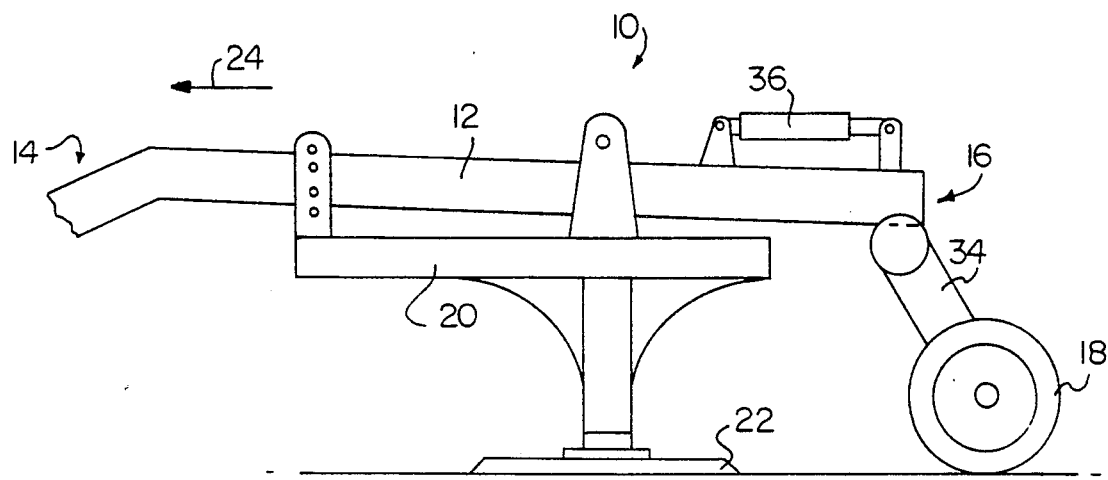
FIG. 1 shows a schematic side view of the main frame part of a first embodiment of a tree stump cutter, in accordance with the invention
Figure 2:
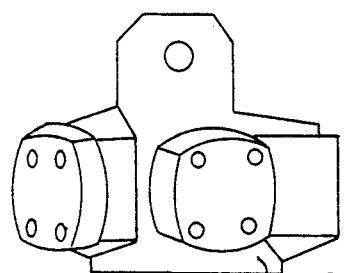
FIG. 2 shows a side view of one cutter blade arrangement of the tree stump cutter of FIG. 1.
Figure 3:
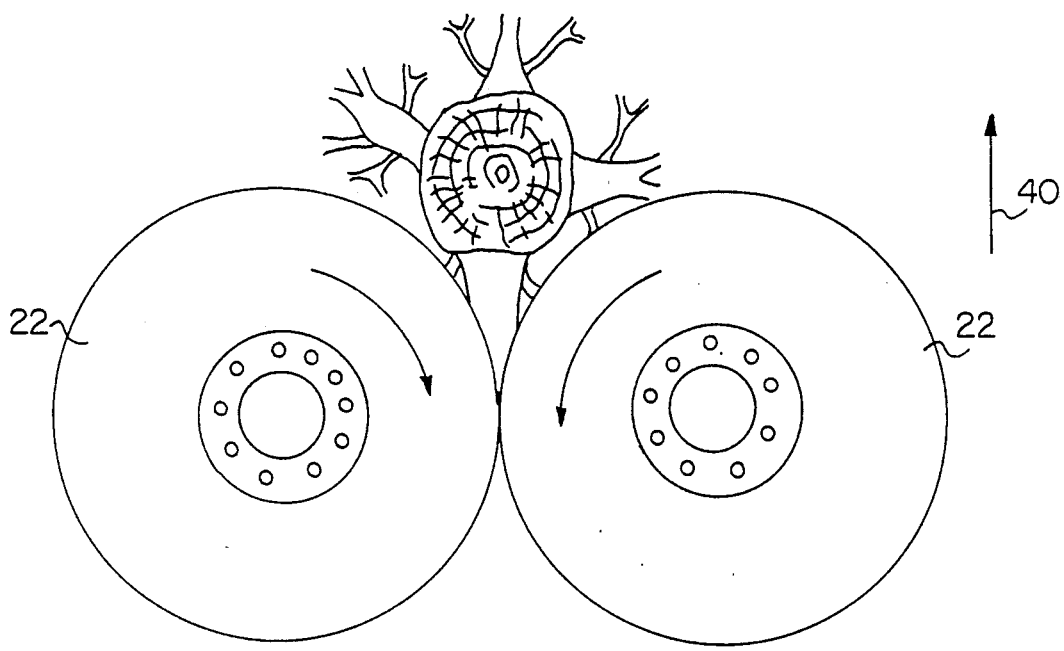
FIG. 3 illustrates the cutter blade configuration of the tree stump cutter of FIG. 1, in its operative configuration.

Referring initially to FIGS. 1 to 3 of the drawings, a first embodiment of a tree stump cutter, in accordance with the invention, is generally indicated by the reference numeral 10. The tree stump cutter 10 generally includes a main metal section frame 12, defining a longitudinal axis along the length thereof, one end 14 of the frame including a coupler (not shown) for coupling the frame 12 on to a tractor, whereas the opposite end 16 of the frame 12 has two wheels 18 mounted thereon. As such, the main frame 12 can be towed behind a tractor and be displaced along a line substantially parallel to the said longitudinal axis of the frame. The main frame 12 has a sub-frame 20 pivotally mounted thereon, the sub-frame 20 carrying two rotatable, circular cutting blades 22, the axes of the cutting blades being positioned along a line perpendicular to the longitudinal axis of the main frame 12. The pivotal configuration of the sub-frame 20 provides for the blades 22 to be angularly positioned with respect to a substantially horizontal soil level, this angular configuration being such that upon rotation of the blades 22 and the forward displacement of the cutter 10 in the direction of arrow 24, the blades will tend to penetrate the soil, this penetration of soil being described in more detail hereafter.

Referring particularly to FIG. 2 of the drawings, the blades 22 are replaceably mounted on to a support structure 26, thus rendering the blades easily replaceable when required. A drive shaft 28 projects through each support structure 26, thereby coupling the blades to the outputs of separate hydraulic motors 32, via suitable couplings 30. The exact configuration of this construction, with respect to the main frame 12, is not clearly shown in the drawings, but this can clearly be carried out in various different modes.

The two hydraulic motors are hydraulically coupled with a hydraulic pump (not shown) that can drive the hydraulic motors 32 and that can itself be coupled to the power take-off of a tractor, whereby the pump can be driven. For purposes hereinafter described, the hydraulic motors 32 will provide for rotation of the blades 22 in opposite directions, the cutting edges of the blades directly opposing one another (as shown in FIG. 3), it further being preferred that the plane of the respective blades be inclined with one another, the lower most point of the blades being the point where the blades directly oppose one another. This is not clearly shown in the drawings. It is also anticipated that the cutting edges of the blades can partially overlap one another in their operative configuration.

In order to control soil penetration by the cutting blades 22, the wheels 18 are mounted on to pivotally displaceable support arms 34, the pivotal displacement of the support arms being controlled by piston/cylinder arrangements 36 that are operatively connected to the support arms 34, permitting pivotal displacement of the support arms about axes parallel to the axes of rotation of the wheels 18. It will be clear from FIG. 1 of the drawings that through pivotal displacement of the support arms 34, the height of the main frame 12 and sub-frame 20 above the soil level along which the cutter 10 is displaced can be varied, this pivotal displacement of the support arms 34 thus permitting penetration of the cutting blades into the soil during rotation of the blades and displacement of the cutter 10. It is particularly anticipated that provision should be made for the cutter 22 to penetrate soil to a depth of between 150 mm and 500 mm, the operative height of the sub-frame at least remaining such that the cutter 10 can pass over tree stumps to be cut by the cutter.

It is accordingly anticipated that different cutters may be provided for cutting down different height tree stumps and it is also anticipated that the cutter 10 may be displaced along one side of a tractor for such applications where tree stumps can also not pass beneath the lower most parts of a tractor. The above can clearly be accommodated by simple mechanical variations. Also, the exact operation of the cutter 10 is variable and other variations and constructions are therefore not described in an further detail herein.

For use, the cutter 10 being towed behind a tractor which will also drive the hydraulic pump of the cutter from its power take-off, the hydraulic motors 32 for the blades 22 will be operated for rotating the cutter blades in opposite directions as illustrated in FIG. 3 of the drawings. The arrow 40 indicates the operative direction of displacement of the cutter, in use. As use is initiated and a tree stump is approached, the height adjustment mechanism as above described will be rendered operative so that the rotating cutting blades will penetrate the soil to a predetermined depth. As soon as this depth is reached, the blades will also approach the tree stump to be cut and because of the opposite direction of rotation of the cutter blades 22, a tree stump will effectively centre itself between the cutter blades that will then cut through the tree stump at the desired depth beneath ground level. The cutter blades will clearly be of a suitable material that is sufficiently wear resistant to give them an acceptable life, the height adjustment mechanism ensuring that the displacement of the cutter in use, is not unduly impeded. Clearly, the size of a tree stump that can be cut with the cutter will be determined by the size of the cutter blades and, in particular, the spacing between the support structures 26 of the cutter blades.

Figure 4:
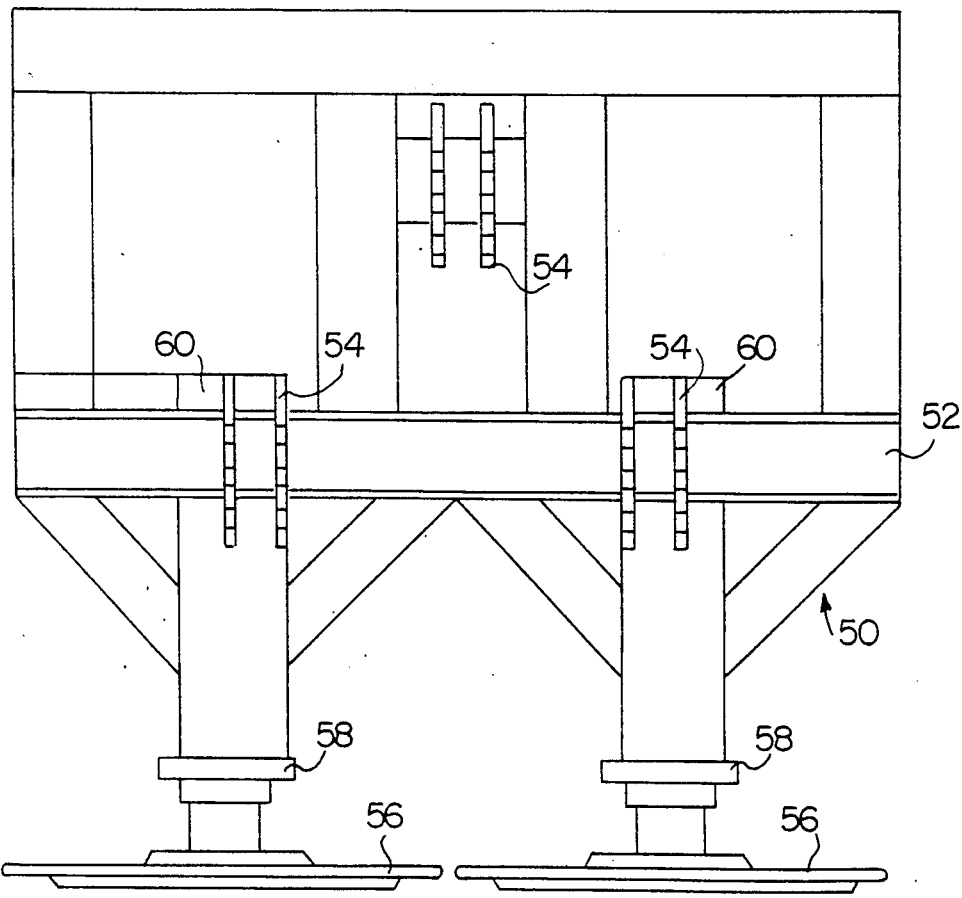
FIG. 4 shows a rear elevational view of a second embodiment of a tree stump cutter, in accordance with the invention.
Figure 5:
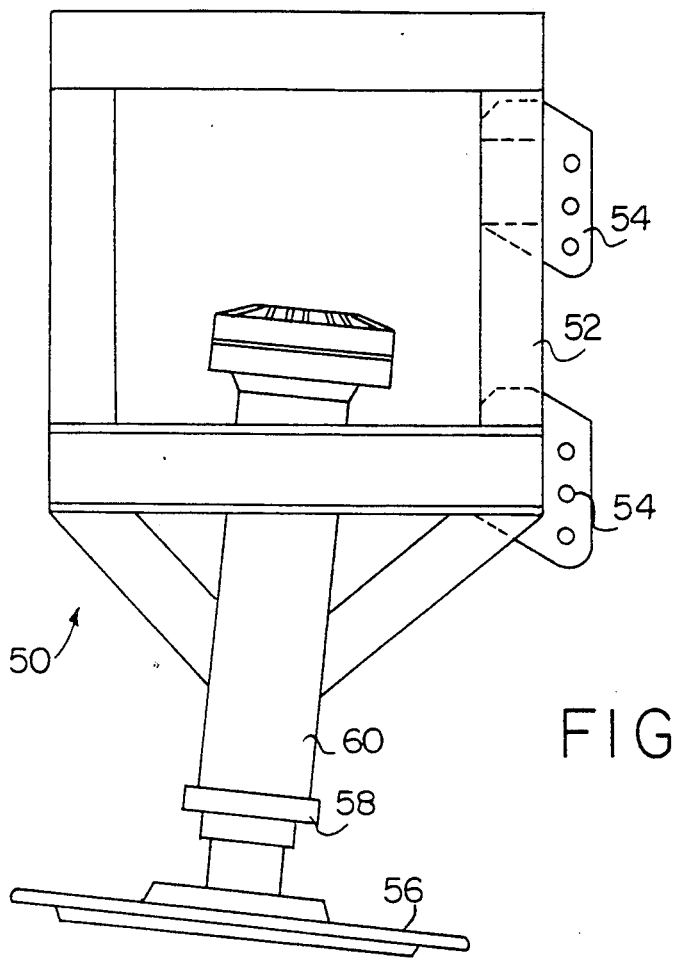
FIG. 5 shows a side view of the tree stump cutter of FIG. 4.
Figure 6:
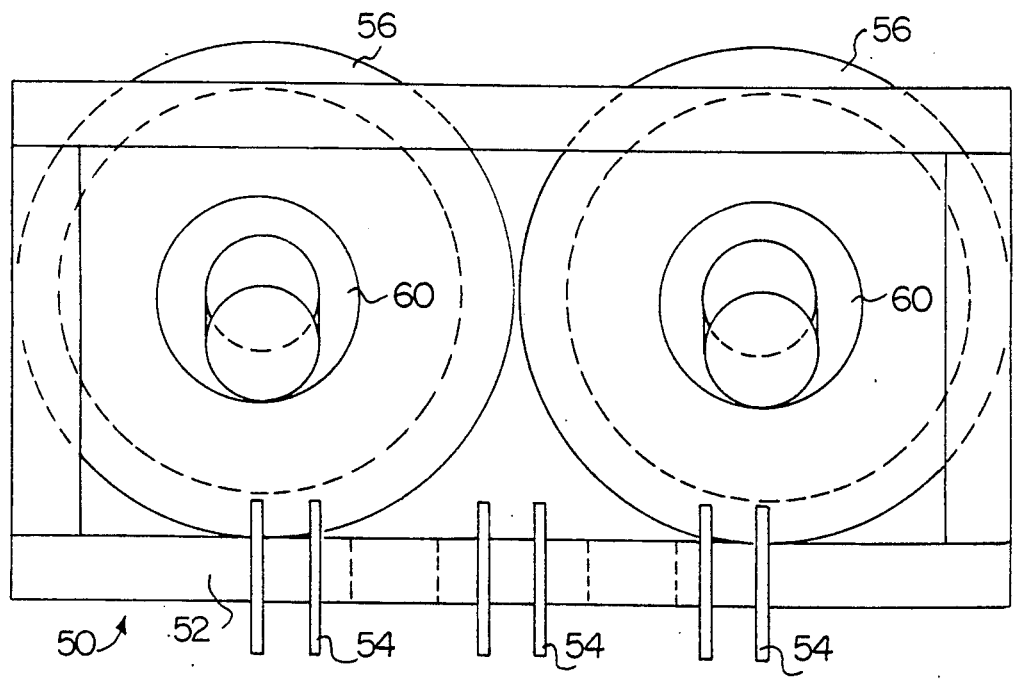
FIG. 6 shows a plan view of the tree stump cutter of FIG. 4.

Referring now to FIGS. 4 to 6 of the drawings, a second embodiment of a tree stump cutter, in accordance with the invention, is generally indicated by the reference numeral 50. The tree stump cutter 50 again includes a support frame 52, the support frame 52 having three coupling formations 54 secured thereto, the coupling formations 54 being specifically adapted to permit the frame 52 to be coupled with a conventional three point coupling of a tractor. This three point coupling of a tractor can clearly provide for the necessary manipulation of the tree stump cutter 50 insofar as it can control the height of the frame 52 above ordinary ground level and will thus also permit soil penetration of the blades 56 in a similar manner to the soil penetration of the cutter 10 as described above. The blades 56 are disposed operatively beneath the support frame 52 and are coupled via suitable couplings 58 to separate hydraulic motors 60, the hydraulic motors permitting connection to hydraulic outputs of a tractor to which the frame can be coupled in order to provide for the motors to be driven and, as such, for rotation of the blades 56.

As is clearly illustrated in FIG. 5 of the drawings, the blades 56 are again inclined with respect to the general soil level in normal use of the cutter 50, this angle of inclination again being in the region of five degrees and again providing for soil penetration to a desired depth as will be controlled by the three point coupling of a tractor to which the frame can be coupled.

The hydraulic motors 60 can again rotate the blades 56 in opposite directions equivalent to the directions of rotation of the blades 22 of the tree stump cutter 10 and, as such, the operation of the tree stump cutter 50 can be equivalent to that of the tree stump cutter 10 as is described above. The necessary manipulation of the tree stump cutter 50 will be controlled directly from a tractor by controlling the position of the three point coupling thereof and, as such, the tree stump cutter 50 provides a simpler construction than that of the tree stump cutter 10, while still incorporating all the essential features thereof.

The exact configuration of the blades 56, with respect to each other, is again slightly variable in that they may be disposed as shown or at a slight angle to one another and it is also anticipated that these blades may marginally overlap, the main consideration being that the axes of rotation of the blades must be spaced by a distance equal to approximately the sum of the radii of the blades which, for equal diameter blades, will be approximately equal to the diameter of each blade.

The spacing between the frame 52 and the blades 56 is again such that a tree stump to be cut can pass beneath the frame 52 between the hydraulic motors 60, thus permitting uninhibited cutting of tree stumps at a depth approximately between 150 mm and 600 mm beneath soil level.

Figure 7:
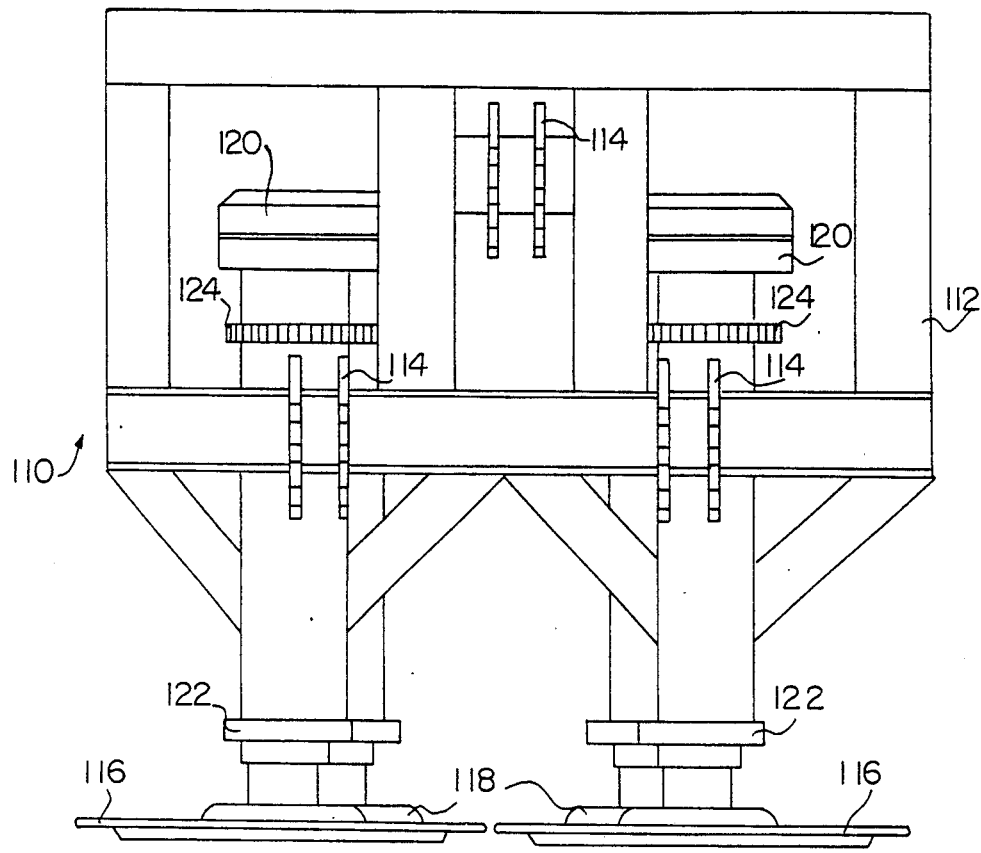
FIG. 7 shows a rear elevational view of a third embodiment of a tree stump cutter, in accordance with the invention.
Figure 8:
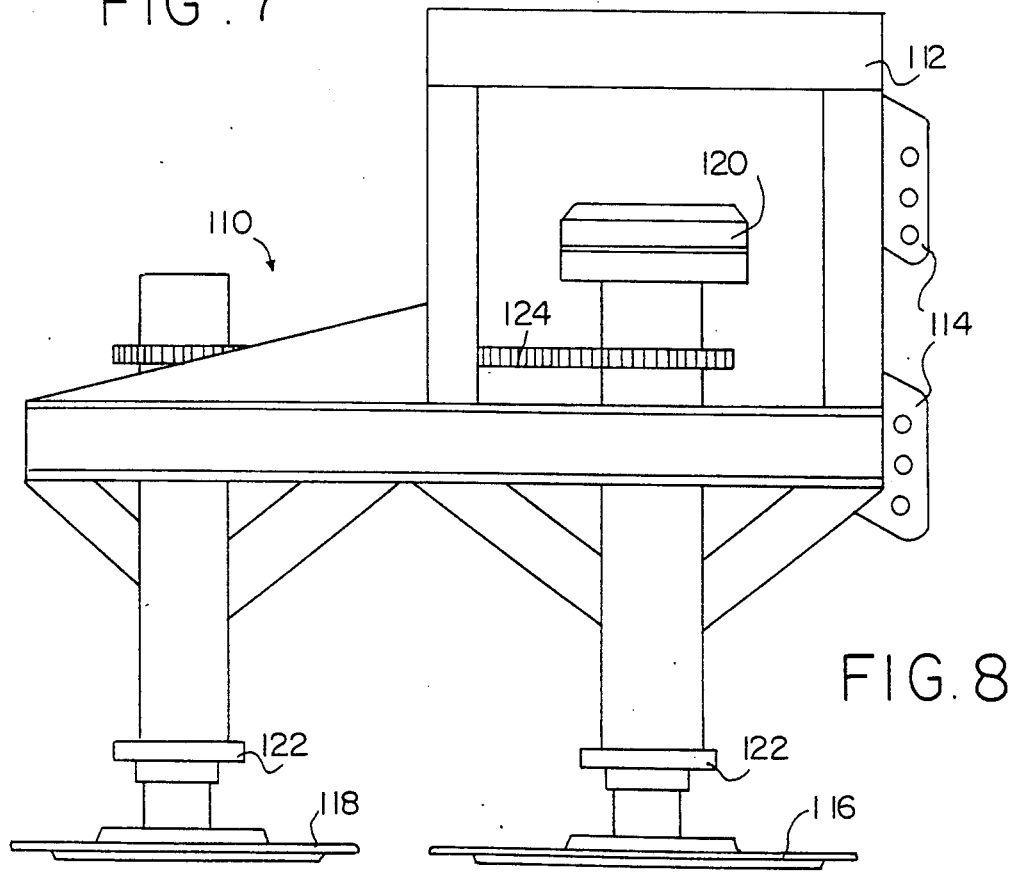
FIG. 8 shows a side view of the tree stump cutter of FIG. 7.
Figure 9:
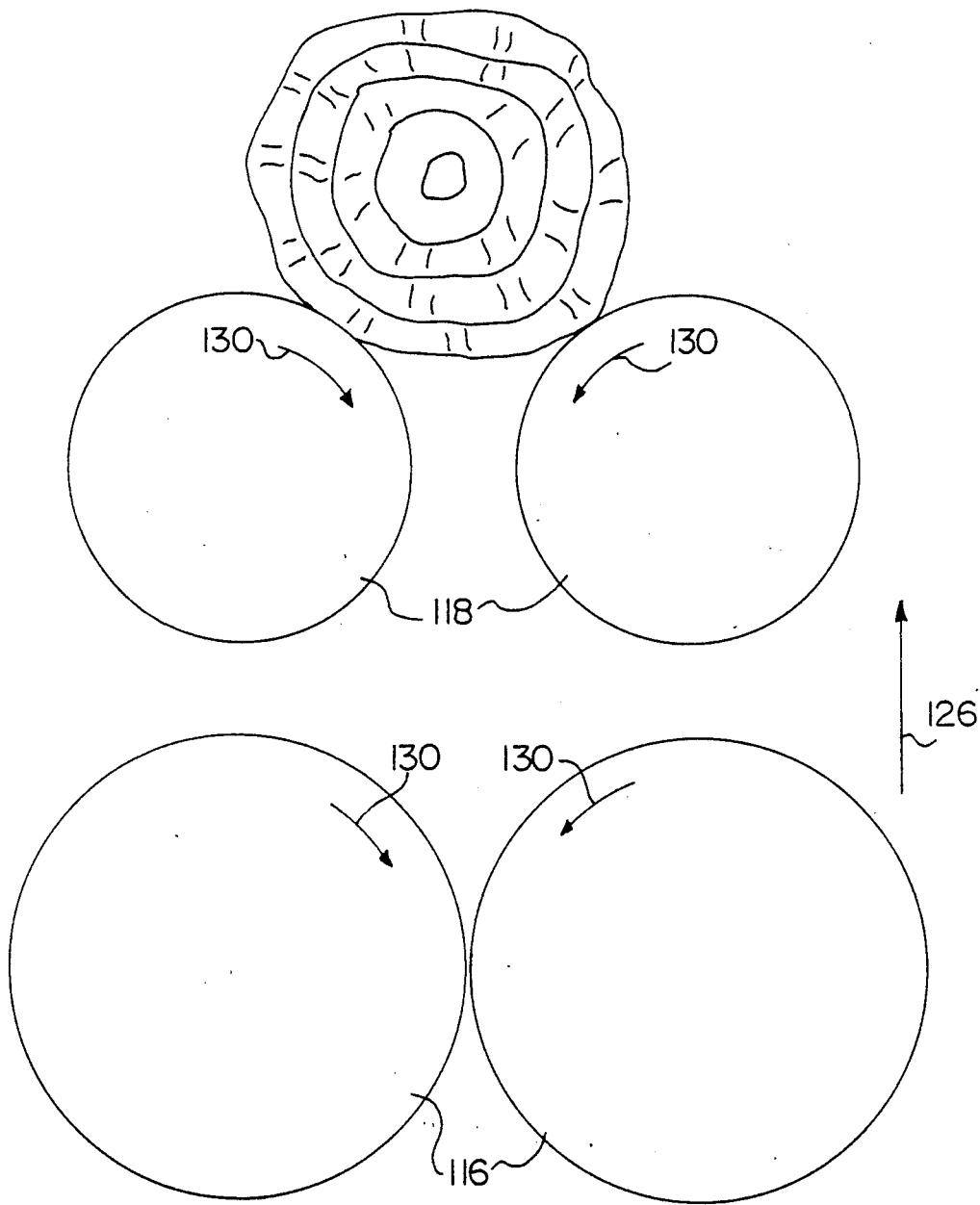
FIG. 9 illustrates the cutter blade configuration of the tree stump cutter of FIG. 7, in plan view.

Referring to FIGS. 7 to 9 of the drawings, a third embodiment of a tree stump cutter, in accordance with the invention, is designated generally by the reference numeral 110. The tree stump cutter 110 includes a support frame 112, the support frame 112 having three coupling formations 114 secured thereto, the coupling formations being specifically adapted to permit the frame 112 to be coupled with a three point coupling of a tractor, the said three point coupling of the tractor preferably being positioned at the operative front end of the tractor.

This three point coupling of the tractor is adapted to provide for the necessary manipulation of the tree stump cutter 110, insofar as it can control the height of the frame 112 above ordinary ground level.

The particular tree stump cutter 110 includes a first pair of circular cutting blades 116 and a second pair of circular cutting blades 118, the pairs of cutting blades being disposed operatively beneath the support frame 112 so that by manipulating the height of the frame 112 above ordinary ground level, soil penetration by the blades is permitted and controlled.

As is clear from these drawings, the pair of blades 118 are disposed operatively forwardly of the pair of blades 116 so that when coupled with a tractor in the manner hereinabove envisaged, the pair of blades 118 will define the leading end of the stump cutter 110.

Each blade of the pair of blades 116 is directly associated with and connected to its own hydraulic motor 120 via a coupling formation 122. The respective blades of the pair of blades 118 are operatively connected to one of the hydraulic motors of the pair of blades 116 via a drive arrangement (not clearly illustrated) including a chain 124, the said drive arrangement 124 thus providing for rotation of the pair of blades 118 via the hydraulic motors 120.

As is clearly illustrated in FIGS. 7 and 8 of the drawings, all the blades 116 and 118 are disposed substantially in the same horizontal plane and although not specifically illustrated, the blades of each pair 116 and 118 may be suitably inclined with respect to the general soil level in normal use of the cutter, the angle of inclination being in the region of five degrees and providing for soil penetration to a desired depth of the blades, as will be controlled by the three point coupling of a tractor to which the frame can be coupled.

As is clearly illustrated in FIG. 9 of the drawings, with arrow 126 indicating the desired direction of displacement of the cutter 110, the pair of blades 118 are disposed operatively forwardly of the pair of blades 116. Also the axes of rotation of the pair of blades 118 and the pair of blades 116 intersect parallel lines that are disposed perpendicular to the desired direction of displacement of the cutter 110, the axes of rotation of the respective pairs of blades also being equally spaced from a common line disposed centrally between the blades and perpendicular to the said parallel lines defined above.

The axes of rotation of the blades 116 are spaced by a distance approximately equal to the sum of the radii of the blades, the spacing being such that the blades are rotatable without interference with one another. The spacing between the axes of rotation of the blades 118 is such that a free space is defined between the blades 118, so that a tree stump to be cut will initially be partially cut through by the blades 118 whereafter cutting will be completed by the blades 116. Typically, the diameter of the blades 116 is 100 mm and the spacing between the axes of rotation of the blades is just over 1000 mm, whereas the blades 118 can have a diameter of 800 mm, the spacing between the axes of rotation of these blades being approximately 1000 mm.

The hydraulic motors 120 rotate the blades of the pairs 116 and 118 in opposite directions, the direction of rotation of the blades being indicated by the arrows 130. In use, the tree stump cutter can be displaced by a tractor to which it is coupled along a line along which tree stumps to be cut are positioned, manipulation of the tree stump cutter with respect to the soil being controlled by hydraulically operated piston/cylinder mechanism, or the like, which may be associated with the coupling acting between the tree stump cutter and the tractor.

The effective operation of the tree stump cutter 110 is effectively equivalent to that of the stump cutters 10, 50, except insofar as cutting now occurs in two stages as explained above.

It is believed that the tree stump cutters 10, 50, 110 of the invention will be very effective and will provide for the cheap removal of tree stumps, particularly when compared with known methods.

The particular hydraulic motors used and, in particular, the power requirements of these hydraulic motors will be determined by the overall requirements of the tree stump cutter, which in turn will be determined by the diameter of tree stumps to be cut and, clearly, the nature of the tree stumps to be cut. It is believed that by providing suitable motors and by suitably adapting the tree stump cutter as described, provision can be made for cutting almost any diameter tree stumps in a quick and efficient manner which will be cost effective.

I claim:

1. A tree stump cutter comprising:
   (a) a support frame having a central longitudinal axis along which said stump cutter can be moved;
   (b) a first pair of circular cutting blades, each of said blades having an axis of rotation and a radius and lying in a plane, each of said blades being rotatably mounted on said support frame in a configuration in which said blades lie in substantially the same plane, said blades being rotatable about parallel axes that are separated by a distance approximately equal to the sum of the radii of said blades, so that said blades rotate without interference with one another;
   (c) a drive means for rotating said blades; and
   (d) a coupling means for coupling said support frame to a displacement means, said coupling means being positioned and shaped such that said blades are held in a configuration so that when said stump cutter is moved and said blades are rotated, a tree stump can be cut off by said blades beneath ground level when the stump passes between the axes of rotation of said blades.

2. The tree stump cutter of claim 1, wherein said coupling means couples the support frame and said tree stump cutter to a displacement means by a three point coupling on said displacement means.

3. The tree stump cutter of claim 1, which includes a depth control means which permits control over the depth beneath ground level at which said blades can cutoff a tree stump.

4. The tree stump cutter of claim 1, wherein the axes of rotation of said blades are disposed on opposite sides of the central longitudinal axis of said support frame.

5. The tree stump cutter of claim 4, wherein the axes of rotation of the blades intersect a line perpendicular to a line of displacement of said stump cutter.

6. The tree stump cutter of claim 1, wherein the plane defined by said blades is inclined with respect to the general ground level beneath which tree stumps must be cut during use of said stump cutter, the angle of inclination being such that said blades will tend to penetrate the ground further during displacement of said stump cutter.

7. The tree stump cutter of claim 1, wherein the drive means for rotating said cutting blades includes at least one hydraulic motor mounted on said support frame.

8. The tree stump cutter of claim 1, wherein the drive means for rotating said cutting blades includes at least one hydraulic motor mounted on said support frame.

9. The tree stump cutter of claim 8, which includes a hydraulic motor for rotating each cutting blade.

10. The tree stump cutter of claim 8, wherein said hydraulic motors can be driven by a hydraulic power supply of said displacement means for moving said stump cutter.

11. The tree stump cutter of claim 1, wherein the drives means can rotate said blades in opposite directions, the direction of rotation of said blades being such that during moving of said stump cutter while cutting through a stump, the rotation of said blades will tend to center said stump between said blades.

12. The tree stump cutter of claim 1, which further comprises:
   (a) a second pair of circular cutting blades, each of said blades having an axis of rotation and a radius and lying in a plane, said second pair of circle cutting blades being rotatable mounted on said support frame in a location operatively forwardly of said first pair of cutting blades with respect to the line of displacement along which a displacement means can move said stump cutter, said blades of said second pair of blades being mounted on said support frame in a configuration in which said blades lie in substantially the same plane as said first pair of blades, said blades being rotatable about parallel axes that are separated by a distance larger than the sum of the radii of said blades; and
   (b) drive means for rotating said second pair of cutting blades, said coupling means, with said support frame coupled to said displacement means, holding said two pairs of cutting blades in a configuration so that when said stump cutter is moved and said blades are rotated, a tree stump can be partially cut through by said second pair of blades beneath ground level when the stump passes between the axes of rotation of said second pair of blades and is finally cut-off by said first pair of blades when the stump passes between the axes of rotation of said first pair of blades.

13. The tree stump cutter of claim 12, wherein said displacement means is a tractor and wherein a three-point coupling of said tractor is coupled to the support frame of said tree stump cutter by the coupling means.

14. The tree stump cutter of claim 12, which includes depth control means for controlling the depth beneath ground level at which said blades can cut-off a tree stump.

15. The tree stump cutter of claim 12, wherein the axes of rotation of the blades of said first and second pairs of blades are disposed on opposite sides of the central longitudinal axis of said support frame.

16. The tree stump cutter of claim 15, wherein the axes of rotation of the blades of said first and second pairs of blades respectively, intersect parallel lines perpendicular to said line of displacement of said stump cutter.

17. The tree stump cutter of claim 12, wherein the plane defined by said first and second pairs of blades is inclined with respect to the general ground level beneath which tree stumps must be cut during use of said stump cutter, the angle of inclination being such that said blades will tend to penetrate the ground further during displacement of said stump cutter.

18. The tree stump cutter of claim 17, wherein the said angle of inclination is approximately five degrees with respect to the general ground level.

19. The tree stump cutter of claim 12, wherein the drive means for both said first pair of cutting blades and said second pair of cutting blades includes at least one hydraulic motor mounted on said support frame.

20. The tree stump cutter of claim 19, which includes one hydraulic motor for rotating one cutting blade of each pair of cutting blades 21. The tree stump cutter of claim 20, wherein said hydraulic motors can be driven by a hydraulic power supply of said displacement means for moving said stump cutter.

22. The tree stump cutter of claim 12, wherein said drive means can rotate the blades of each pair of blades in opposite directions, the direction of rotation of said blades of each pair of blades being such that during displacement of said stump cutter, while cutting through a stump, the rotation of said blades of each pair of blades will tend to center the stump between said blades of each said pair of blades.

* * * * *

UNITED STATES PATENT AND TRADEMARK OFFICE
CERTIFICATE OF CORRECTION

PATENT NO. : 5,048,579

DATED : September 17, 1991

INVENTOR(S) : Johnny D. Lloyd

It is certified that error appears in the above-identified patent and that said Letters Patent is hereby corrected as shown below:

On the title page:
At the Abstract, line 1, please rewrite "than" as --that--.

At column 2, line 27, please delete "cutter" between "stump" and "can".

At column 3, line 36, please rewrite "arrow 24" as --arrow 40--.

At column 6, line 50, please rewrite "mechanism" as --mechanisms--.

At column 7, Claim 11, line 2, please rewrite "drives" as --drive--.

At column 7, Claim 12, Item A, line 4, please rewrite "rotatable" as --rotatably--.

Signed and Sealed this

Sixteenth Day of March, 1993

Attest:

STEPHEN G. KUNIN

*Attesting Officer*    *Acting Commissioner of Patents and Trademarks*